UNITED STATES PATENT OFFICE.

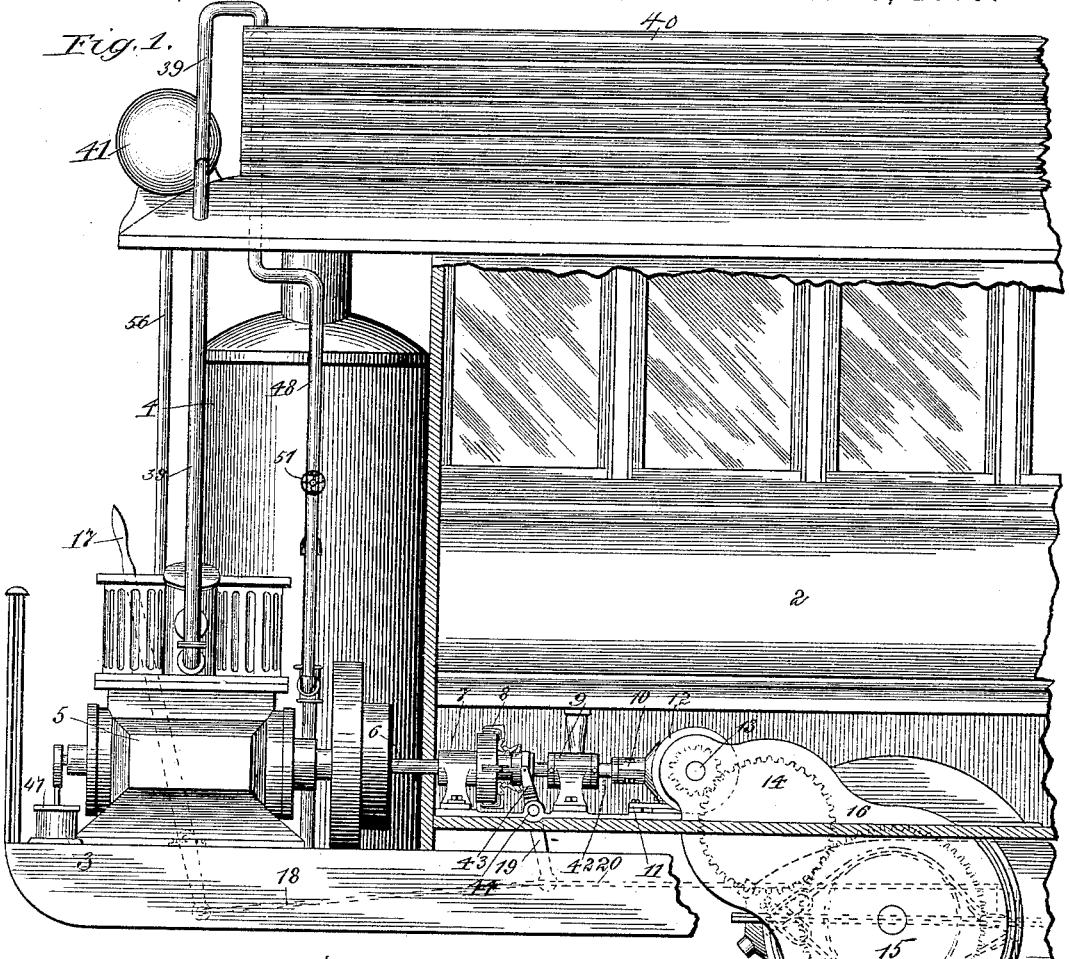

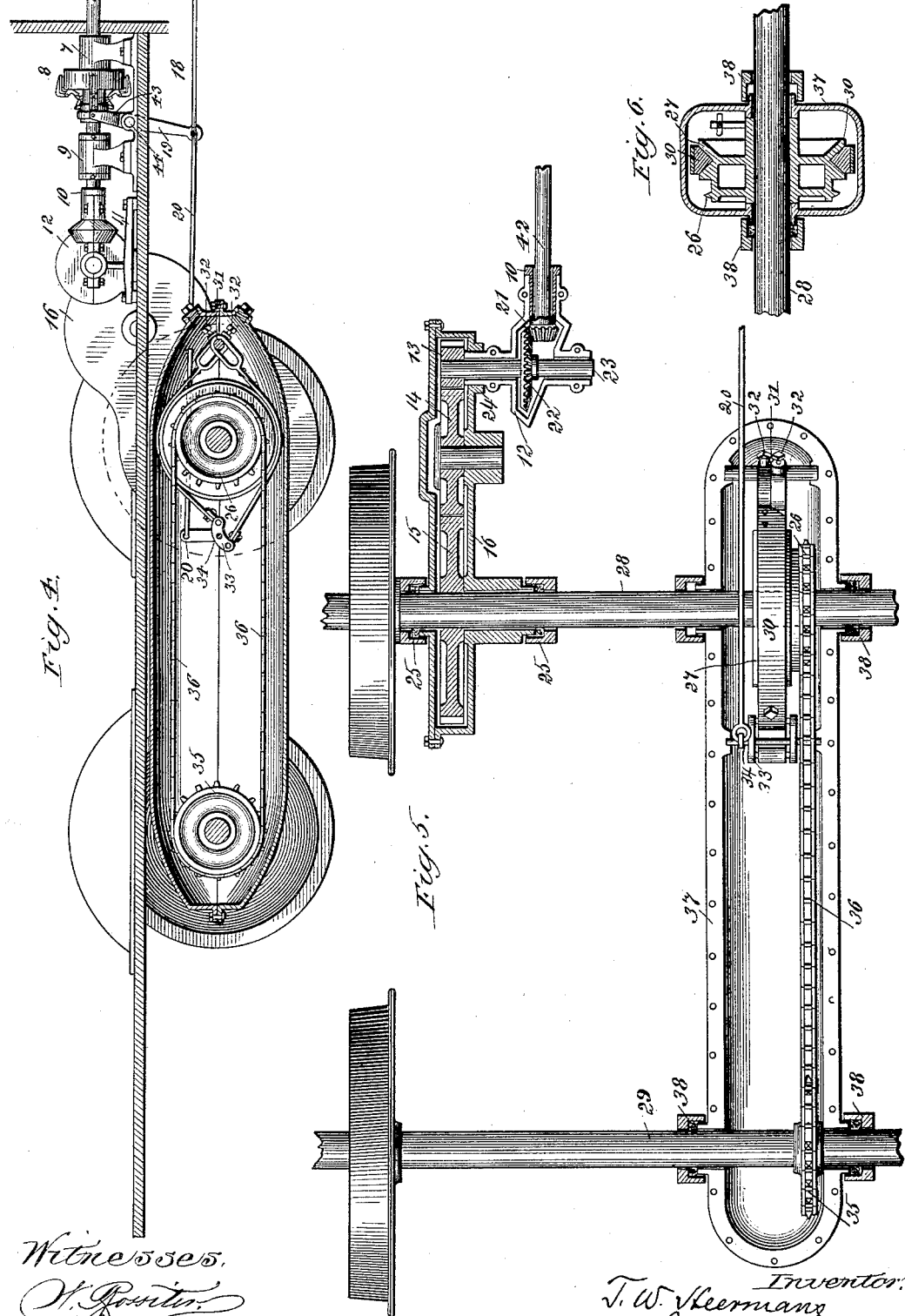

THADDEUS W. HEERMANS, OF CHICAGO, ILLINOIS.

CAR-MOTOR.

SPECIFICATION forming part of Letters Patent No. 398,723, dated February 26, 1889.

Application filed March 21, 1888. Serial No. 267,972. (No model.)

*To all whom it may concern:*

Be it known that I, THADDEUS W. HEERMANS, of Chicago, in the county of Cook and State of Illinois, have invented certain new and useful Improvements in Car-Motors, of which the following is a specification.

My invention has for its chief objects the application of a steam or other engine to the propulsion of street-cars and similar vehicles in such a manner as to render the full power of the engine available for starting the car and getting it rapidly under way, and, further, to reduce the manipulations necessary for starting and stopping the car to the smallest possible number and the simplest kind, in order that they may be made quickly and with certainty even by comparatively unskilled drivers.

My invention consists in the parts and combinations hereinafter described and claimed.

In the accompanying drawings, Figure 1 is a side view of the front part of a street-car embodying my invention, the side of the car being removed to show the interior. Figs. 2 and 2ª are detail views of the surface condenser 40, Fig. 1. Fig. 3 is a front view of the car on a smaller scale than Fig. 1. Fig. 4 is a longitudinal section of the floor of the car, showing the driving machinery, the point of view being in the opposite side from that of Fig. 1. Fig. 5 is a plan view, partly in section, of the car-axles and the driving machinery. Fig. 6 is a cross-section of the sprocket and brake wheel 26 27 and adjacent parts.

Upon the front platform, 3, of the car 2 is located a boiler, 4, and engine 5. The boiler and engine may be of any suitable kind, and are not herein shown in detail, for the reason that they form no part in themselves of the present invention. For the purpose of carrying out my invention, however, I have selected as most suitable an engine and boiler of the automatic type—that is, in which the supply of water and fuel to the boiler and of steam to the engine are automatically regulated— several kinds of which are well known and in common use. Thereby the attention of the driver is released from all care for the fuel and water supply and from the care of his engine, and he can devote himself wholly to the management of the car. The boiler-furnace is fed with liquid fuel in a tank, 41, on the roof of the car through a pipe, 56, and the supply is automatically regulated to maintain a constant boiler-pressure.

The shaft 6 of the engine extends back through the pillow-block 7, between which and the pillow-block 9 is a friction-clutch, 8, which may be of any approved kind. One part of the clutch 8 is secured to the shaft 6, and the other to the shaft 42, which is in line with shaft 6, the whole being on one side of the car, so as to extend under the seats. The clutch 8 is operated by the fork 43 on the shaft 44. Shaft 42 (*vide* Fig. 5) is connected to the axle 28 of the car by the train of gearing comprising the bevel-gears 21 22 and the spur-gears 13, 14, and 15. The spur-gears are inclosed in a casing, 16, which surrounds the car-axle 28 and carries the bearing for the gear 14. The admission of dirt at the axle is prevented by stuffing-boxes 25 25. At the end of casing 16 farthest from the axle 28 is a boss or hub, 24, in which the cylindric part of casing 12, which covers the bevel-gears, is fitted so as to turn easily. The separation of the two casings 16 and 12 is prevented by the pinion 13 and the bevel-gear 22, which are secured on the shaft 23. The bevel-gear 21 is fitted to the casing 12, so as to revolve freely therein, end motion being prevented by the bearing 10. Said bevel-gear 21 is free to move endwise on shaft 42, but is compelled to revolve therewith by means of a feather in the shaft. The casing 12 is supported in ways 11 on the car-floor, Figs. 1 and 4, which allow it to slide back and forth without disturbing its alignment. The effect of the construction just described is to permit the free play of the springs between the car and axles without affecting the driving-gearing, the rise and fall of the car-axles producing simply a slight movement of the casing 12 in the slide 11 and of the bevel-gear 21 on the shaft 42.

Keyed upon the car-axle 28 is the brake-drum 27 and sprocket-wheel 26, they being preferably cast in one piece, as shown. A second sprocket-wheel, 35, is keyed to axle 29 and the two wheels are connected by the chain 36. A casing, 37, surrounds the whole and excludes dirt, having stuffing-boxes 38 38 upon the axles for this purpose. The brake-bands 30 30 are held at one end by the pin 31, which is secured to the casing 37, and are attached at the other end to the operating-lever 33, which vibrates on the pin 34, and is connected by the rod 20 to the arm 19 of the shaft 44, before mentioned as operating the clutch-fork 43. The brake-bands are adjusted by the set-screws 32 32 abutting against the pin 31. Attached to the arm 19, or to a similar arm on the same shaft, 44, is a rod, 18, which extends to the driver's lever 17.

Upon the roof of the car is located a tank, 41, for holding the oil fuel and a surface condenser, 40, the latter being shown in detail in Figs. 2 and 2ᵃ. It will be seen to consist of a series of pairs of corrugated plates of sheet metal united by suitable return-bends, a set being located on each side of the roof, the whole affording a large area of radiating-surface.

The detail views, Figs. 2 and 2ᵃ, show the construction of the condenser. The return-bends *b* have openings on their flat side fitted to the corrugated plates *a*, which are so joined as to form a series of tubes practically. (*Vide* Fig. 2ᵃ.) The plates *a* and return-bends *b* may be soldered or brazed together. The exhaust-steam is led to the condenser by the pipe 39, which enters a cross-pipe, 45, at an elevated point. The condensed water is drained off at the rear and carried to a tank below the back platform. This tank is not shown, as its connection with the other parts is easily understood without an illustration.

The feed-pipe 46, conveying the water from the feed-pump 47 to the boiler 4, is provided with a pipe, 48, which is connected to the feed-pipe at a point intermediate between the check-valve 50 and the pump 47 and leads to the condenser 40. In said pipe 48 is a cock or valve, 51, which may be opened to allow the water from the feed-pump to pass to the condenser and assist in cooling it when the boiler is sufficiently full. The valve 51 may be operated by hand or a float in the boiler, such as is commonly used to control the feed.

The pipes and connections of the boiler and engine are omitted, except so far as they are necessary to illustrate the invention; but they may be readily supplied by the skilled workman.

The operation of my invention will be easily understood without further explanation. The engine being once started may be allowed to run continuously, the starting and stopping of the car being effected wholly by the manipulation of lever 17, which, it will be seen, puts the friction-clutch in operation and releases the brake when thrown forward, and throws out the clutch and applies the brake when thrown back. By thus running the engine continuously and at full speed its full power is available for starting the car, which may thus be done quickly, and the driver's attention is concerned with only one, and that a very simple, operation.

Provision may be made for reversing-gear either on the engine or in connection with the bevel-gears 21 and 22 (*vide* Fig. 5) by an additional bevel-gear on shaft 23 opposite to gear 22, and arranging for gear 21 to mesh in either in a well-known manner; but such an additional complication and source of confusion are to be avoided except in special cases.

I have shown the axles of the car connected by a chain gearing; but it is obvious that connecting-rods such as are used on locomotives, or any equivalent therefor, might be used, or that on level tracks such connection might be unnecessary.

I claim—

1. The combination, in a car-motor, of a continuously-running engine, a shaft in axial line with the engine-shaft, a clutch connecting said shaft with the engine-shaft, driving mechanism connecting the first-named shaft to the car-axles, a brake, and a single lever connected to and operating said clutch and brake.

2. The combination of the continuously-running engine 5, the clutch 8, the shaft 42, and gearing connecting the same to the car-axle, the cross-shaft 44, having the clutch-fork 43 and arm 19 thereon, the brake-operating rod 20, the driver's lever 17, and connecting-rod 18.

3. The combination of the casings 16 and 12, pivotally connected to each other and inclosing the train of gearing and the slide 11, as and for the purpose set forth.

4. The combination, in a car-motor, of an engine upon the platform outside the car, a shaft at one side of the car extending longitudinally beneath the seats and driven through a clutch-connection by said engine, gearing connecting said shaft to the car-axles, a brake, and a single lever connected to and operating both the brake and the clutch, substantially as described.

THADDEUS W. HEERMANS.

Witnesses:
P. H. T. MASON,
J. I. VEEDER.